Patented Sept. 14, 1943

2,329,583

UNITED STATES PATENT OFFICE 2,329,583

RESINOUS COMPOSITION FOR WIRE COATINGS AND THE LIKE

Ansley O. Blades, Rome, N. Y., assignor to General Cable Corporation, New York, N. Y., a corporation of New Jersey No Drawing. Application August 2, 1940, Serial No. 350,132

6 Claims. (Cl. 260—27)

This invention relates to improvements in insulating and protective coverings for wires and cables, and more particularly to synthetic resin compositions therefor, and to plasticizers used to impart to such compositions certain qualities desirable for these coverings. Some resins, as for example, the polyvinyl chloride resins, are less tough, more brittle, and less cohesive, and therefore less suitable, for such coverings than certain copolymer resins such, for example, as the copolymer produced by the conjoint polymerization of vinyl chloride and vinyl acetate. However, some of these copolymers, including that of vinyl chloride and vinyl acetate, require plasticizing before they can be used effectively for this purpose.

In respect of plasticizers to be used in electrical insulating compositions, they must be compatible with the resin with which they are to be blended; and it is very important that, when blended with the resin, they should produce a compound that is easy to handle during milling, extrusion, and strip-covering operations, that has sufficient strength and elongation, and that is heat-resistant enough to remain flexible indefinitely at 80° C., as well as to preserve its normal properties at temperatures as low as —20° C. It is also necessary that these plasticizers shall have good electrical properties. Most plasticized copolymer compositions have a power factor of 5% or over and a dielectric constant of 5% or over.

I have discovered that such a plasticizer may be produced by combining hydrogenated methyl abietate either with an ester, such as dioctyl phthalate, which has two hydrocarbon chains of at least eight carbon atoms each, or with an ester which has a hydrocarbon chain of eighteen carbon atoms, such as acetylated castor oil, butoxy ethyl stearate, or butyl acetyl ricinoleate. The heat stability of hydrogenated methyl abietate is greatly improved by the addition of one or more of the above plasticizers, such as dioctyl phthalate, acetylated castor oil, butoxy ethyl stearate and butyl acetyl ricinoleate. The combination of any or several of the above plasticizers with hydrogenated methyl abietate has not only good electrical properties but also good heat resistance. By using any of these plasticizing compositions in combination with vinyl chloride-vinyl acetate copolymer, an insulating and protective covering for wires may be obtained having a dielectric constant as low as 3 and a power factor as low as 3%.

The following method may be used to blend the plasticizer, and such fillers as are used, with the resin. The resin is placed in a suitable container and the plasticizer stirred into it. At this point a physical mixture only is obtained since the resin, which will generally be two or three times the volume of the plasticizer, will not dissolve in the plasticizer. Next, a preferably volatile solvent such as acetone is added in sufficient quantity to form, on further stirring, a stiff dough; and the mixture is stirred about five minutes to insure perfect dispersion of the acetone and plasticizer throughout the mass of resin particles, and then allowed to stand tightly covered for about ten minutes to give the acetone time to soften the individual resin particles. Small amounts of this blended dough are then placed in a conventional rubber mill, the rolls of which are set closely together (about .020") to crush the softened resin particles, the roll surfaces being maintained at a temperature of about 200 to 220° F. This temperature, with the frictional effect of the mill, is sufficient to cause the acetone-softened resin to combine with the plasticizer. The heat causes the acetone to evaporate gradually, leaving the resin and plasticizer blended into a homogeneous mass. Finally, the filler or fillers are added in the usual manner.

When the resin used in such a composition is a copolymer of vinyl chloride and vinyl acetate, say in the ratio of from 85–95 parts of the chloride and 15–5 parts of the acetate, the proportion of the ingredients may be, for example, in accordance with the following formula:

| | Parts by weight |
|---|---|
| Resin (10% acetate) | 100 |
| Hydrogenated methyl abietate | 22.5 |
| Butyl acetyl ricinoleate | 7.5 |
| Acetylated castor oil | 7.5 |
| Butoxy ethyl stearate | 7.5 |
| Sublimed litharge | 4 |
| Blanc fixe | 20 | or again, in accordance with the following formula:

| | Parts |
|---|---|
| Resin (5% acetate) | 100 |
| Hydrogenated methyl abietate | 40 |
| Dioctyl phthalate | 10 |
| Butyl acetyl ricinoleate | 10 |
| Sublimed litharge | 4 |
| Blanc fixe | 20 |

The foregoing formulae, it will be understood, are by way of example only. It will be noted that in the first of these formulae, the hydrogenated methyl abietate constitutes one-half of the plasticizing mixture and in the second, two-thirds; these two formulae have been selected to indicate, among other things, the approximate proportional range of the hydrogenated methyl abietate in the plasticizer which has been found to produce the best results. Both of the compounds produced thereby extrude easily, give smooth, shiny surfaces, are tough and flexible even at as low a temperature as —20° C., and have good heat-ageing properties at 80° C., and excellent electrical properties. They are also resistant to moisture, oil and flame. They may be applied by the strip-covering method as well as by extrusion. Moreover, in addition to their use as insulation, they may be used as overall jackets.

I claim as my invention:

1. An insulated electrical conductor comprising a conductor and an insulation of vinyl acetate-vinyl chloride copolymer containing not more than 15% of the acetate and plasticized with hydrogenated methyl abietate and dioctyl phthalate, said insulation having a dielectric constant of 4 or lower and a power factor of 4% or lower at 70° F.

2. A composition for use as an insulating and protective covering for conductors, comprising a copolymer of vinyl chloride and vinyl acetate as a base, and a plasticizer therefor comprising one part of hydrogenated methyl abietate and not more than one part of an ester having two hydrocarbon chains of at least eight carbon atoms each.

3. A composition for use as an insulating and protective covering for conductors, comprising a copolymer of vinyl chloride and vinyl acetate as a base, and a plasticizer therefor comprising one part of hydrogenated methyl abietate and not more than one part of dioctyl phthalate.

4. A composition for use as an insulating and protective covering for conductors, comprising a copolymer of vinyl chloride and vinyl acetate as a base, and a plasticizer therefor comprising approximately two parts of hydrogenated methyl abietate and one part of dioctyl phthalate.

5. A composition for use as an insulating and protective covering for conductors, comprising a copolymer of vinyl chloride and vinyl acetate as a base, and a plasticizer therefor consisting of approximately four parts of hydrogenated methyl abietate and one part each of dioctyl phthalate and butyl acetyl ricinoleate.

6. A composition for use as an insulating and protective covering for conductors, comprising a copolymer of vinyl chloride and vinyl acetate containing not over 15% of the acetate, and a plasticizer therefor comprising hydrogenated methyl abietate and dioctyl phthalate.

ANSLEY O. BLADES.